United States Patent [19]

Hanley

[11] 4,285,490

[45] Aug. 25, 1981

[54] APPARATUS FOR PARTIALLY PRE-MAKING A SOLID-LIQUID BEVERAGE

[76] Inventor: Michael W. Hanley, 6000 Sun Forest Dr., #2701, Houston, Tex. 77092

[21] Appl. No.: 106,277

[22] Filed: Dec. 21, 1979

[51] Int. Cl.³ .......................... A23G 9/00; B29C 6/00
[52] U.S. Cl. .................... 249/92; 249/120; 249/121; 249/129; 249/97; 426/515; 426/393; 426/101
[58] Field of Search ............... 426/515, 393, 101, 524, 426/590, 100, 90, 91, 89, 95, 131, 112; 249/83, 91, 92, 96, 97, 93, 94, 119, 120, 121, 129, 133, DIG. 4

[56] References Cited

U.S. PATENT DOCUMENTS

| | | | |
|---|---|---|---|
| 1,476,910 | 12/1923 | Naugle | 249/121 X |
| 2,702,011 | 2/1955 | Larkin | 249/92 |
| 2,961,849 | 11/1960 | Hitchcock | 249/83 |
| 3,411,463 | 11/1968 | Moseres | 249/92 |
| 3,461,192 | 8/1969 | Di Stasio | 249/DIG. 4 |
| 3,680,828 | 8/1972 | Livett | 249/121 X |
| 3,721,419 | 3/1973 | Bolinger | 249/121 X |
| 3,799,493 | 3/1974 | Beck et al. | 249/121 X |
| 4,239,175 | 12/1980 | Strawbinger | 249/121 X |

*Primary Examiner*—J. Howard Flint, Jr.
*Attorney, Agent, or Firm*—Pravel, Gambrell, Hewitt, Kirk, Kimball & Dodge

[57] ABSTRACT

A freezable, edible substance is placed in a forming cup mounted by the base upon a lid. A serving cup is invertedly mounted over the first cup and closed by the lid after which the substance is solidified. When final preparation of the beverage is desired, the two cups are inverted and the first cup and lid are removed, leaving a frozen mound in said serving cup into which a drinkable liquid is poured around the solid substance.

5 Claims, 9 Drawing Figures

U.S. Patent  Aug. 25, 1981  Sheet 1 of 2  4,285,490
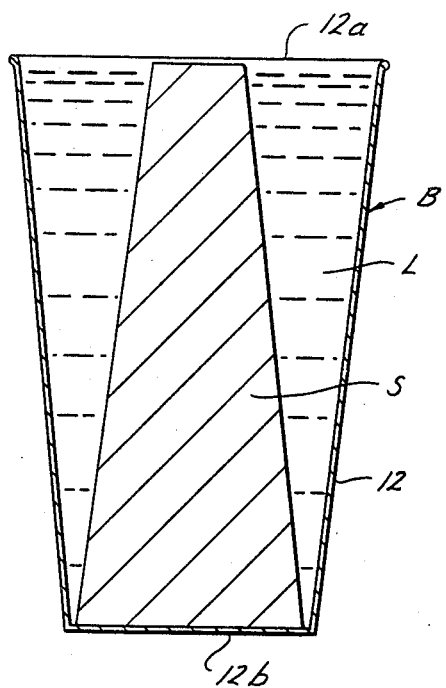
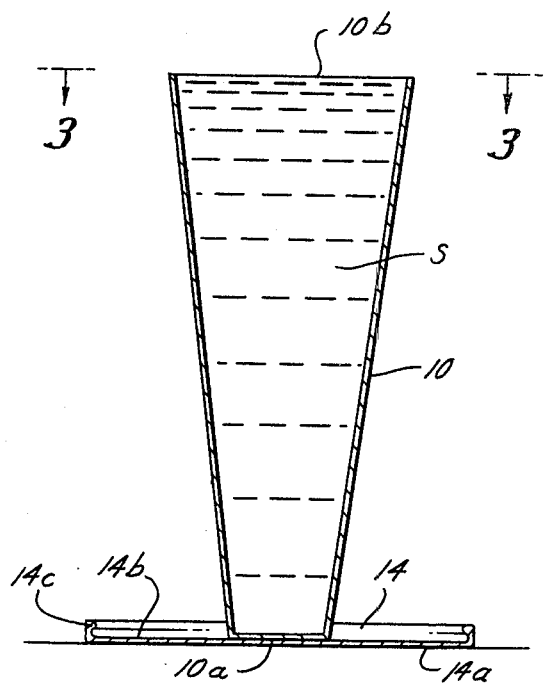
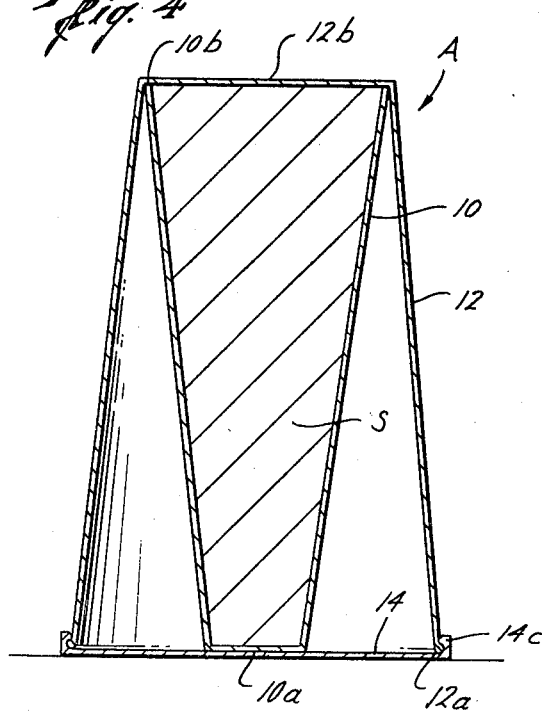
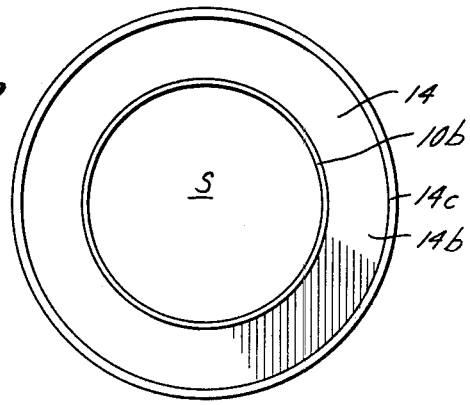
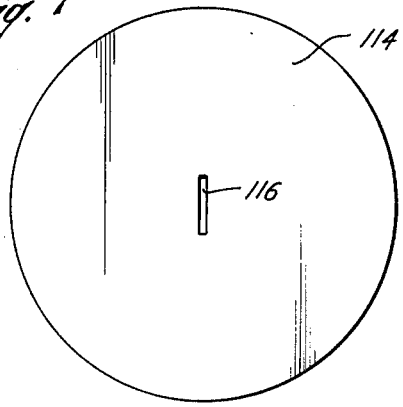

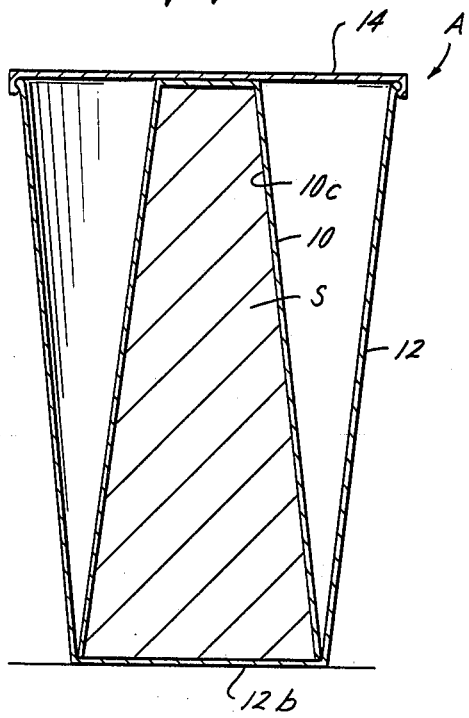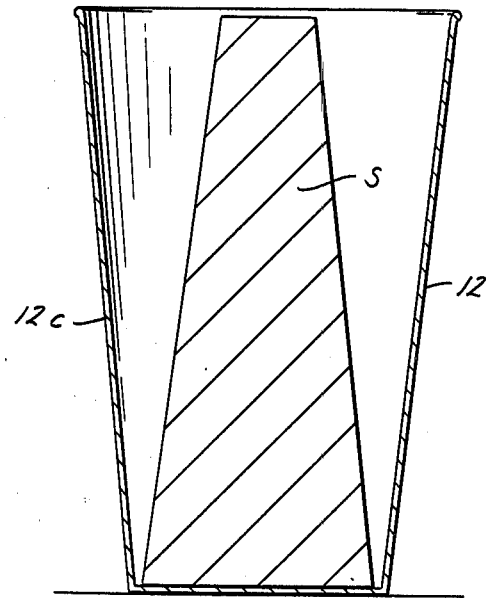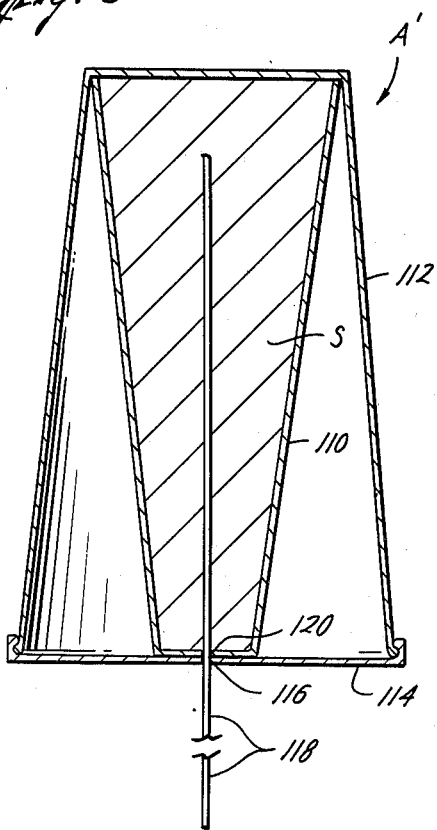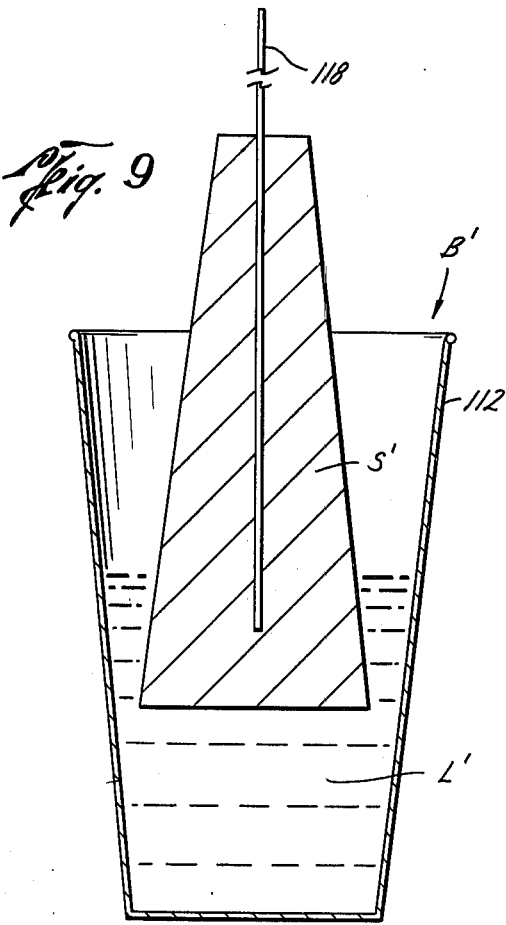

APPARATUS FOR PARTIALLY PRE-MAKING A SOLID-LIQUID BEVERAGE

TECHNICAL FIELD

This invention relates to an apparatus for making beverages. More specifically, this invention relates to an apparatus for making beverages wherein the beverage, which includes an edible solid substance such as ice cream in a liquid, is partially pre-prepared to minimize time and effort in dispensing the beverage for a consumer.

PRIOR ART

Many soda fountains serve a drink, often called an "ice cream float," wherein ice cream is served with a carbonated liquid within a glass. Other drinks are also served wherein liqueurs or other drinkable liquids are poured over ice cream in a serving container. Edible substances other than ice cream, such as cakes, fruits or custards, may serve as a base for a drink with a liquid poured over them.

Generally speaking, these drinks or beverages are formed by scooping ice cream or other substance from a container, placing the ice cream or other substance in a suitable glass or cup and then pouring a liquid over the ice cream or other substance. This procedure is complex enough that such beverages are not commonly served as a "convenience food," i.e. a premade food for sales through outlets where extensive preparation by the purveyor is not desired.

SUMMARY OF THE INVENTION

This invention is to provide a new and improved apparatus for producing a solid-liquid beverage. A freezable, edible substance in liquid or semi-solid condition is initially placed in a forming cup mounted by the base upon a lid. A serving cup inverted relative to the forming cup is mounted over the forming cup and closed by the lid. Then the edible substance is frozen. When final preparation of the beverage is desired, the two cups are inverted and the forming cup and lid removed leaving a frozen mound in the serving cup which is filled with a drinkable liquid. Because the filling, mounting of the cups and freezing may be done long prior to use, the assembly of both cups with the frozen edible substance therein may be sold as a unit whereby the consumer need only remove the lid and forming cup, then add the desired liquid thereby providing an easy and convenient means of dispensing and making the beverage, requiring minimal time and effort by the purveyor at the time of sale.

BRIEF DESCRIPTION OF THE DRAWINGS

FIG. 1 is a cross-section of the beverage ready for consumption.

FIG. 2 is a cross-section of the first cup, filled with a freezable, edible substance, mounted on the lid.

FIG. 3 is a top view of the first cup and lid as shown in FIG. 2.

FIG. 4 is a cross-section showing the second cup invertedly mounted over the filled first cup and lid.

FIG. 5 is a cross-section of the two cups, inverted relative to FIG. 4.

FIG. 6 is a cross-section of the second cup with the frozen mound after the first cup and lid are removed.

FIG. 7 is a view of the lid in an alternative embodiment with a slot for a stick.

FIG. 8 is a cross-section of the alternative embodiment with the stick placed through the slots in the lid and first cup into the edible substance.

FIG. 9 is a cross-section of the alternative embodiment showing the edible substance being lifted from the liquid.

DESCRIPTION OF THE PREFERRED EMBODIMENT

In the drawings, the letter B designates generally a solid-liquid beverage (FIG. 1) which includes a mound of frozen edible substance S, such as ice cream or sherbert, surrounded by a drinkable liquid L, such as a carbonated drink or fruit juice, mounted on the base 12b of a serving cup 12 within the serving cup 12. The method and apparatus for preparing the solid liquid beverage B are shown in FIGS. 2 through 6.

FIG. 2 shows the freezable, edible substance S poured in an unfrozen state into a forming receptacle cup 10. The forming or first cup 10 is preferably frusto-conical shaped with the smaller end 10a being the base end and the larger end 10b being open and uppermost when liquids are poured into the first cup 10.

The first cup base 10a is mounted to a cup lid 14. The mounting may be either temporary or permanent and by any means well known in the art such as adhesives and including molding or other forming of the cup 10 and lid 14 together as a single unit. The cup lid 14 has an exterior surface 14a shown lowermost in FIG. 2, an interior surface 14b and a rim 14c which is used to mount the cup lid 14 to and close the second cup 12. The first cup 10 and the cup lid 14 may be made of many substances including metal if it is desirable to make them reusable, or a coated paper similar to that used in ice cream cartons, but preferably will be of a disposable plastic material.

FIG. 3 shows the first cup 10 and cup lid 14 as seen along line 3—3 of FIG. 2 showing the edible substance S poured into the first cup 10 substantially up to the larger end 10b. Also, shown from above are the interior surface 14b and the rim 14c of the cup lid 14.

After the first cup 10 is filled with the freezable edible substance S, the serving or second cup 12 is placed over the first cup 10 in an inverted position, relative to first cup 10 as seen in FIG. 4, thereby closing open end 10b. The larger or open end 12a is mounted to and closed by the rim 14c of the cup lid 14. The first cup 10, second cup 12 and lid 14 form assembly A (FIG. 4).

The second cup 12 is preferably frusto-conical shaped and has, along with the larger end 12a, a smaller or base end 12b which is designed to fit snugly over the open end 10b of the first cup 10. Therefore, the inner diameter of the base end 12b is preferably approximately equal to the outer diameter of the open end 10b. Because in the preferable method of forming the drink, the assembly A will not be inverted until the edible substance S is frozen, it is not necessary that the fit between the first cup 10 and the second cup 12 be air or liquid tight. If it is desired to invert assembly A prior to freezing substance S, then the closing of open end 10b by second cup base 12b must be leak proof relative to substance S in its unfrozen state. If it is desired to leave a relatively smaller mound of edible substance S in second cup 12, base end 12b may be considerably larger than the first cup open end 10b.

The second cup 12 may be formed of any number of materials but would preferably be formed of a disposable plastic material. It is possible to form the second cup 12 out of an edible substance like a conventional ice cream cone so that the second cup 12 may be eaten along with the drinkable liquid L and the edible solid substance S.

FIG. 5 shows the present invention as prepared for sale or use at a convenience food store. Assembly A has been inverted relative to FIG. 4 after the edible substance S was frozen. Now, the second cup base end 12b serves as the base for the entire assembly with the first cup 10 being inside the second cup 12 and preferably being sealed by the cup lid 14. For preparing the beverage, the cup lid 14 and the first cup 10 will be removed leaving, as shown in FIG. 6, a mound of the edible substance S within the second cup 12 of approximately the same height as the second cup 12. There is a space between the mound and the second cup wall 12c, capable of being filled with a liquid, which will then produce the solid-liquid beverage B ready for consumption as shown in FIG. 1.

The interior surface 10c (FIG. 5) of first cup 10 may be coated with a lubricating substance to aid in the separation of the first cup 10 from the frozen edible substance S. Such a lubricant would be one of the non-toxic tasteless lubricants known in the art.

In preparation for sale of the partially pre-made beverage, the lid 14 and first cup 12 may be removed, leaving the mound of substance S within second cup 12, and replaced by another removable lid (not shown). In such a procedure, a teflon coating could be used on the interior of the first cup 10 in place of the lubricant.

An alternative embodiment of the present invention is shown in FIGS. 7 through 9. In the alternative embodiment, a slot 116 (shown in FIG. 7) is formed in the lid 114 and a matching slot 120 is formed in the first cup 110. The slots 116 and 120 allow a stick 118 to be inserted through the lid 114 and the first cup 110 and into the edible substance S', prior to freezing of the edible substance S'. The stick 118 is inserted far enough into the edible substance S' to create a secure bond after freezing. Enough of the stick 118 is left above the edible substance S' to provide an easy grip of the stick 118 above the edible substance S'. When the lid 114 and the first cup 110 are removed from assembly A', the stick 118 will remain embedded within substance S'. In this manner, a beverage B' may be formed as in FIG. 9 whereby during the consumption of the beverage B', the edible substance S' may be lifted by use of the stick 118 out of the liquid L' to allow consumption of the edible substance S' separately from the liquid L'.

Other modifications may be made in the edible substance to make the beverage more desirable to consumers such as the use of several different edible substances formed in layers to provide different flavors, tastes, and textures within one beverage. Also during the freezing process, an object such as candy or a toy prize may be placed within the frozen edible substance to be found during consumption of the beverage.

The foregoing disclosure and description of the invention are illustrative and explanatory thereof and various changes in the size, shape, materials and steps as well as the details of the illustrated construction may be made without departing from the spirit of the invention.

I claim:

1. Apparatus for making a solid-liquid beverage, comprising:
   a first cup suitable for being filled with a freezable, edible substance;
   said first cup having a base at one end and being open at the opposite end;
   a cup lid mounted with the base of said first cup; and,
   a second cup having a base for mounting over the open end of said first cup and an open end for engaging said lid when said first cup and said second cup are assembled together.

2. The apparatus set forth in claim 1, wherein:
   said second cup is frusto-conical shaped with the larger end being said open end and mounted to said lid.

3. The apparatus set forth in claim 2, wherein:
   said first cup is frusto-conical shaped with said base being the smaller end of said first cup and being mounted to said lid.

4. The apparatus set forth in claim 1, further comprising:
   slots in said first cup and said lid adapted to have a stick inserted therethrough into the edible substance.

5. Apparatus for making a solid-liquid beverage, comprising:
   a first frusto-conical cup suitable for being filled with an edible substance with an open end which is the larger end and a base end which is the smaller end;
   a cup lid with an exterior side, an interior side and a closing rim;
   said first cup base end mounted with said cup lid interior side;
   a second frusto-conical cup with an open end which is the larger end and a base end which is the smaller end;
   said base end of said second cup fitting over said open end of said first cup; and
   said larger end of said second cup adapted to be closed by said closing rim of said lid.

* * * * *